United States Patent
Maeda et al.

(10) Patent No.: US 7,635,191 B2
(45) Date of Patent: Dec. 22, 2009

(54) MANUFACTURING METHOD FOR VARIABLE SHAPE MIRROR

(75) Inventors: Shigeo Maeda, Osaka (JP); Katushiko Tanaka, Shiga (JP); Akira Ishii, Shiga (JP); Susumu Sugiyama, Shiga (JP)

(73) Assignee: Funai Electric Co., Ltd., Osaka (JP)

( * ) Notice: Subject to any disclaimer, the term of this patent is extended or adjusted under 35 U.S.C. 154(b) by 331 days.

(21) Appl. No.: 11/889,025

(22) Filed: Aug. 8, 2007

(65) Prior Publication Data
US 2008/0291519 A1 Nov. 27, 2008

(30) Foreign Application Priority Data
Aug. 9, 2006 (JP) ............... 2006-216660

(51) Int. Cl.
*G02B 5/08* (2006.01)
*G02B 7/182* (2006.01)
*H01L 21/00* (2006.01)

(52) U.S. Cl. ............... 359/849; 359/900; 438/69

(58) Field of Classification Search ............... 359/846, 359/849, 900; 438/29, 69; 310/311; 216/24–26; 257/E27.006; 29/25.35
See application file for complete search history.

(56) References Cited

U.S. PATENT DOCUMENTS

| | | | | |
|---|---|---|---|---|
| 5,506,720 A | * | 4/1996 | Yoon | 359/224.1 |
| 5,696,618 A | * | 12/1997 | Ji et al. | 359/224.1 |
| 5,759,753 A | * | 6/1998 | Namba et al. | 438/456 |
| 5,982,010 A | * | 11/1999 | Namba et al. | 257/415 |
| 6,123,985 A | | 9/2000 | Robinson et al. | 427/162 |

FOREIGN PATENT DOCUMENTS

| | | |
|---|---|---|
| EP | 1 263 059 A1 | 12/2002 |
| JP | 08-190070 | 7/1996 |
| JP | 08-285708 | 11/1996 |
| JP | 2003-131015 | 5/2003 |
| JP | 2004-109562 | 4/2004 |
| JP | 2004-109769 | 4/2004 |
| JP | 2004-146487 | 5/2004 |
| JP | 2004-226457 | 8/2004 |
| JP | 2006-171319 | 6/2006 |
| WO | WO 93/25929 | 12/1993 |

* cited by examiner

*Primary Examiner*—Stephone B Allen
*Assistant Examiner*—Christopher P Rivard
(74) *Attorney, Agent, or Firm*—Morgan Lewis & Bockius LLP

(57) ABSTRACT

Manufacturing method for variable shape mirrors suitable for mass production includes steps: for forming first grooves and second grooves along boundaries between areas to be variable shape mirrors on a surface of first wafer to be support substrate and a surface of second wafer to be mirror substrate; for arranging first and second wafer so that support pillars and piezoelectric elements are sandwiched between first and second wafer at areas with surface on which second grooves are formed facing inward for bonding; for dividing second wafer into mirror substrates by flattening process of outer surface of second wafer until at least reaching second groove; for dividing first wafer into the support substrates by breaking first wafer along first grooves; and for forming reflection film on outer surface of each of mirror substrates obtained by the dividing step.

11 Claims, 4 Drawing Sheets

MANUFACTURING METHOD FOR VARIABLE SHAPE MIRROR

This application is based on Japanese Patent Application No. 2006-216660 filed on Aug. 9, 2006, and the contents of which are hereby incorporated by reference.

BACKGROUND OF THE INVENTION

1. Field of the Invention

The present invention relates to a manufacturing method for a variable shape mirror that is mounted on an optical pickup device.

2. Description of Related Art

Conventionally, a compact disc (CD) and a digital versatile disc (DVD) are available in the market as an optical recording medium for recording information such as images and sounds. Further, in recent years, a next-generation DVD is in the stage of being commercialized, which uses a laser beam of violet color having a short wavelength for realizing higher density recording. In order to use such an optical disc, an optical disc apparatus is necessary as a driving apparatus. The optical disc apparatus drives the optical disc to rotate and leads the laser beam onto a recording surface of the optical disc, so that information is recorded or erased and that information is reproduced based on reflection light from the recording surface. Further, in order to realize such a function, the optical disc apparatus is equipped with an optical pickup device as a set of units for emitting the laser beam, leading the laser beam onto the recording surface of the optical disc to form a beam spot, and receiving reflection light from the recording surface of the optical disc.

Here, optical pickup devices, particularly next-generation DVDs are adapted to a high numerical aperture (NA) in accordance with a standard to conform, and influence of the spherical aberration that is generated when a thickness of the optical disc varies slightly becomes conspicuous so that a minute beam spot may not be obtained. Therefore, jitter of a reproduced signal is deteriorated, and recording peak power is lowered, so that recording and reproducing quality is lessened as a result.

In addition, the optical axis of the laser beam may be inclined slightly with respect to the recording surface resulting from warpage or the like of the optical disc. In this case, the optical path of the laser beam is bent so that coma aberration is generated, which makes it difficult to condense the laser beam into an appropriate spot diameter. As a result, recording and reproducing quality is deteriorated. There are other factors of deterioration of recording and reproducing quality, which includes positioning accuracy of an optical system such as an optical lens or a beam splitter that is an element of the optical pickup device, which causes astigmatic aberration.

In order to prevent the above-mentioned situation, there is proposed a variable shape mirror that can correct wave aberration such as the spherical aberration. For example, as shown in FIG. 4, the optical pickup device adopting a variable shape mirror 1 in the optical system is made up of a semiconductor laser 12, a collimator lens 13, a beam splitter 14, the variable shape mirror 1, a quarter wave length plate 15, an objective lens 16, a condensing lens 17, a photo detector 18 and the like. A laser beam emitted from the semiconductor laser 12 is made into parallel rays by the collimator lens 13, passes through the beam splitter 14, is reflected by the variable shape mirror 1 after its polarized state is changed by the quarter wave length plate 15, and is condensed by the objective lens 16 so as to reach the recording surface of the optical disc D.

Further, the laser beam reflected by the recording surface of the optical disc D passes through the objective lens 16, is reflected by the variable shape mirror 1, passes through the quarter wave length plate 15, then is reflected by the beam splitter 14 this time, and is condensed by the condensing lens 17 so as to reach the photo detector 18 at last.

The variable shape mirror 1 has a function of a so-called rise up mirror that reflects the laser beam toward the optical disc D and reflects the reflection light from the optical disc D in parallel with the optical disc D. It also has a function of changing its reflection plane if necessary for fine adjustment of a reflection angle of the laser beam, so that wave aberration is corrected. In this case, based on a signal obtained by the photo detector 18, if it is necessary to correct wave aberration, a control portion that is provided to the optical pickup device sends a signal to the variable shape mirror 1 so that a shape of the reflection plane is changed for correcting the aberration.

As to the variable shape mirror 1, there is a type that utilizes characteristics of a piezoelectric element made of a piezoelectric material (see JP-A-2004-109769 and JP-A-2004-226457, for example). This variable shape mirror 1 is generally made up of a support substrate, a mirror substrate that is supported by a support pillar and is opposed to the support substrate, and a piezoelectric element sandwiched between the support substrate and the mirror substrate. The outer surface of the mirror substrate is provided with a reflection film to be a reflection plane for the laser beam. When a predetermined voltage is applied to the piezoelectric element so that an electric field is applied, the piezoelectric element is expanded or contracted between the support substrate and the mirror substrate. The mirror substrate is deformed elastically in accordance with the expansion or the contraction, the reflection film, i.e., the reflection plane is deformed following the deformation of the mirror substrate.

Under the present circumstances, a manufacturing method for such a variable shape mirror that is suitable for mass production is not established yet. For example, in the current situation, in order to manufacture a lot of variable shape mirrors at the same time, there is a method comprising the steps of forming individual parts to be the variable shape mirrors on a wafer, and cutting the wafer for dividing it into individual variable shape mirrors. In this method, individual wafers to be the support substrate and the mirror substrate are prepared, and the support pillar and the piezoelectric element are sandwiched between the wafers within areas to be individual variable shape mirrors. Then, the both wafers and the support pillar, as well as the both wafers and the piezoelectric element are bonded to each other, individually. After that, each of the wafers is cut individually by a disc-shaped dicing saw along boundaries between the areas to be the individual variable shape mirrors, so that it is divided into individual variable shape mirrors. Then, a reflection film is formed on the outer surface of the mirror substrate of each variable shape mirror. Thus, a lot of variable shape mirrors can be obtained at the same time at least.

However, according to this method, distortion will occur in the wafer caused by local residual stresses that are generated at a bonded section between the wafer to be the mirror substrate and the support pillar, and at a bonded section between the wafer and the piezoelectric element. When the wafer becomes the mirror substrate at last, the distortion will remain in the reflection film that is formed on the outer surface of the mirror substrate, so an appropriate reflection plane cannot be obtained. In this case, yield of the obtained variable shape mirrors is reduced, so the method is not suitable for mass production.

In addition, when the wafer is cut by the dicing saw, the wafer, in particular, that is to be the mirror substrate may be damaged as being chipped or broken in many cases. It is because that the wafer is thin and fragile in the first place since the mirror substrate (i.e., its wafer) is required to be deformed elastically in accordance with expansion and contraction of the piezoelectric element as the function of the variable shape mirror described above. Then, yield of the obtained variable shape mirrors is reduced, so the method is still not suitable for mass production.

If the mirror substrate to be each variable shape mirror is cut out from the wafer in advance and the part to be each variable shape mirror is made by using the mirror substrate of a chip level with respect to the support substrate of the wafer level, the damage to the mirror substrate can be reduced not a little when the wafer (for the support substrate) is cut by the dicing saw. In this case, however, the number of mirror substrates of the chip level as elements increases, and management and handle of them are burdensome. Further, manufacturing efficiency of the variable shape mirror is limited, so the method is still not suitable for mass production.

SUMMARY OF THE INVENTION

In view of the above described problem, it is an object of the present invention to provide a manufacturing method for variable shape mirrors, which is suitable for mass production.

To attain the above described object, a manufacturing method in accordance with a first aspect of the present invention for variable shape mirrors, each of the variable shape mirrors including: a support substrate; a mirror substrate that is opposed to the support substrate and is supported by support pillars and has a reflection film on the surface; and piezoelectric elements that are sandwiched between the support substrate and the mirror substrate and are expanded or contracted when an electric field is applied so that they deform the mirror substrate and the reflection film, and the manufacturing method is characterized by including: a first wafer groove forming step for forming first grooves along boundaries between areas to be the variable shape mirrors on a surface of a first wafer to be the support substrate; a second wafer groove forming step for forming second grooves along boundaries between the areas on a surface of a second wafer to be the mirror substrate; a bonding step for arranging the first wafer and the second wafer so that the support pillars and the piezoelectric elements are sandwiched between the first wafer and the second wafer at the areas with the surface on which the second grooves are formed facing inward, so as to bond at least the first wafer and the support pillars to each other, the first wafer and the piezoelectric elements to each other, and the second wafer and the support pillars to each other; a second wafer dividing step for dividing the second wafer into the mirror substrates by flattening process of the outer surface of the second wafer until at least reaching the second groove; a first wafer dividing step for dividing the first wafer into the support substrates by breaking the first wafer along the first grooves; and a reflection film forming step for forming the reflection film on the outer surface of each of the mirror substrates obtained by the dividing step.

According to this structure, a reflection film is formed on the flattened outer surface of the mirror substrate. Therefore, the reflection plane of the reflection film also becomes flat, so that many variable shape mirrors having good quality can be obtained at the same time.

In a manufacturing method in accordance with a second aspect of the present invention it is preferable that the flattening process is a polishing process or an etching process.

In a manufacturing method in accordance with a third aspect of the present invention it is preferable that a thin metal layer is disposed between the first wafer and the support pillar and between the first wafer and the piezoelectric element at their bonding portions, and they are pressed to each other while they are heated, so that they are bonded to each other.

In a manufacturing method in accordance with a fourth aspect of the present invention also it is preferable that a thin metal layer is disposed between the second wafer and the support pillar and between the second wafer and the piezoelectric element at their bonding portions, and they are pressed to each other while they are heated, so that they are bonded to each other.

In a manufacturing method in accordance with a fifth aspect of the present invention it is preferable that the first wafer is arranged so that the surface on which the first grooves are formed faces inward.

According to the manufacturing method for variable shape mirrors of the present invention, many variable shape mirrors having good quality can be obtained at the same time, and the method is sufficiently suitable for mass production.

DETAILED DESCRIPTION OF THE PREFERRED EMBODIMENTS

Figure 1A:
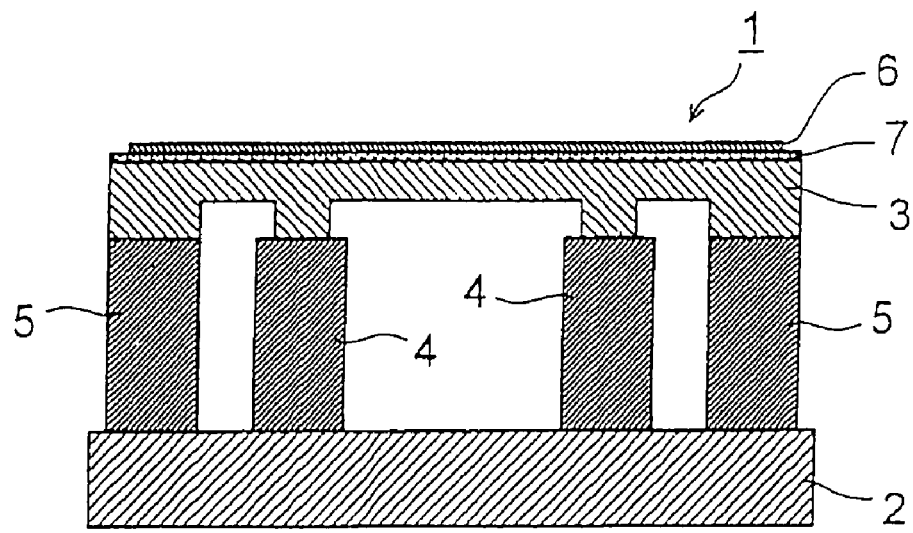
FIGS. 1A and 1B are cross sectional views of a variable shape mirror that is manufactured by a manufacturing method according to an embodiment of the present invention.
Figure 1B:
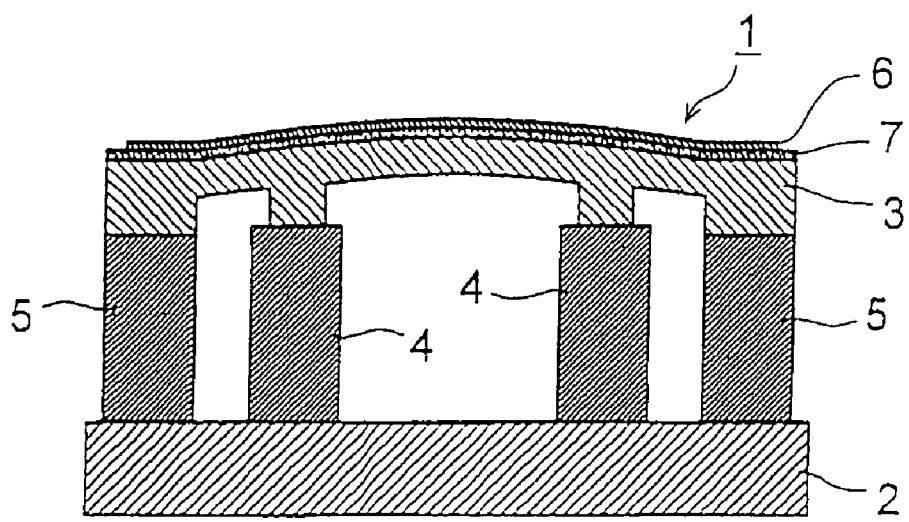
Figure 2:
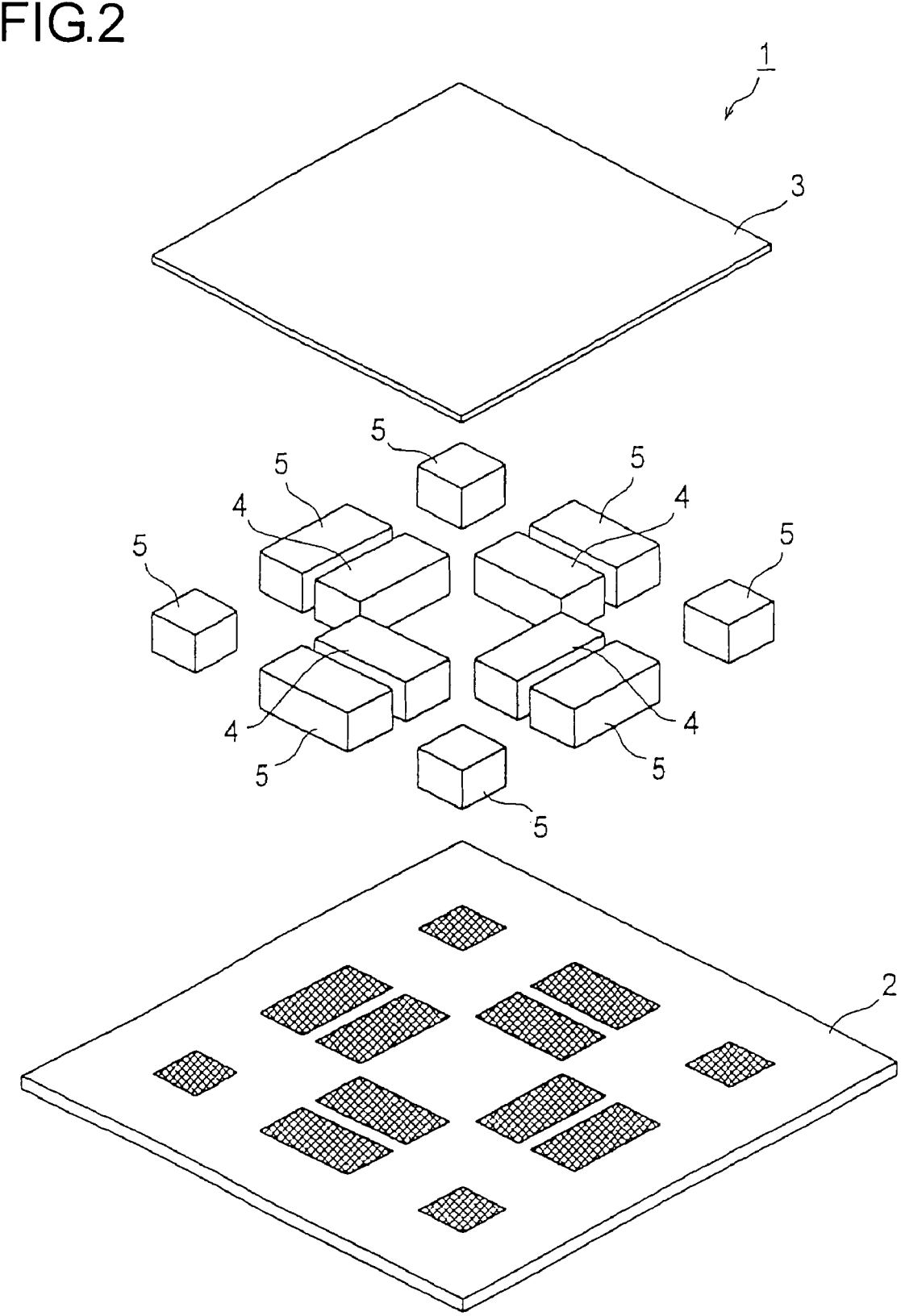
FIG. 2 is an exploded perspective view of the variable shape mirror to show its general structure.

Hereinafter, an embodiment of the present invention will be described in detail with reference to the attached drawings. FIGS. 1A and 1B are cross sectional views of a variable shape mirror that is manufactured by a manufacturing method according to an embodiment of the present invention. FIG. 1A shows a non-driven state, while FIG. 1B shows a driven state. FIG. 2 is a an exploded perspective view of the variable shape mirror to show its general structure, and FIGS. 3A-3E are cross sectional views of the variable shape mirror to show a procedure of the manufacturing method for variable shape mirrors according to an embodiment of the present invention. First, a variable shape mirror 1 in the present embodiment will be described. As shown in FIGS. 1A and 2, the variable shape mirror 1 in the present embodiment includes a support substrate 2 having a substantially square shape, a mirror substrate 3 that has a substantially square shape of a little smaller size than the support substrate 2 and is opposed to the support substrate 2, a plurality of piezoelectric elements 4 that are sandwiched between the support substrate 2 and the mirror substrate 3 at predetermined positions, and a plurality of support pillars 5. The variable shape mirror 1 of this embodiment includes the support pillars 5 disposed at four corners and at substantially centers of four sides of the mirror substrate 3 as shown in FIG. 2, and the piezoelectric elements 4 are disposed inside the support pillars 5 disposed at four sides with a predetermined space. In other words, the piezoelectric elements 4 and the support pillars 5 are disposed in this order outward from the center of the mirror substrate 3 in the cross direction.

The support substrate 2 is a base for supporting individual components. As a material of the support substrate 2, glass can be used. However, other materials as long as having insulation characteristics, such as ceramics, can also be used. This support substrate 2 is provided with a thin film portion made of silicon (Si) that is formed on the surface facing the mirror substrate 3 (i.e., the inner surface) at the positions where the piezoelectric elements 4 and the support pillars 5 are disposed (hatched portions in FIG. 2). In particular, a wiring pattern (not shown) made of the same Si is lead out to a vicinity to the edge of the support substrate 2 from the Si thin film portion of the position where the piezoelectric element 4 are disposed. Note that the Si thin film portions and the Si wiring patterns are formed by photo lithography or the like.

The mirror substrate 3 is a plate that is capable of being deformed in an elastic manner. As a material of it, Si can be used. However, glass or the like, for example, can also be used as long as it can be deformed in an elastic manner. This mirror substrate 3 is provided with a reflection film 6 that has a function as a reflection plane that is formed on the substantially entire surface (outer surface) opposite to the surface (inner surface) facing the support substrate 2. The reflection film 6 is a metal film made of aluminum (Al) or the like, which is formed by vapor deposition or sputtering or the like.

The piezoelectric element 4 is formed in a rectangular solid shape made of a piezoelectric material that is expanded or contracted when an electric field is applied. As the material, PZT (Pb(Zr,Ti)O3, lead zirconate titanate) can be used. However, it can be other piezoelectric ceramics other than the PZT, or can be piezoelectric polymer such as a polyvinylidene fluoride or the like. Note that the shape of the piezoelectric element 4 can be a cylindrical shape or a rectangular column shape.

Each of the piezoelectric elements 4 is bonded onto the Si thin film portion formed on the inner surface of the support substrate 2 via a thin metal layer portion (not shown) that is sandwiched between them. As a material of the thin metal layer portion, Au (gold) can be used, and the thin metal layer portion is formed on the Si thin film portion on the inner surface of the support substrate 2 by vapor deposition or sputtering or the like. However, the thin metal layer portion can be made of not only Au but also Pt (platinum) or the like. In this embodiment, the support substrate 2 and each of the piezoelectric elements 4 are pressed to each other while they are heated, so that metal (Au) atoms of the thin metal layer portion between them are diffused into the Si thin film portion on the inner surface of the support substrate 2 and into the piezoelectric element 4 (PZT). Thus, the support substrate 2 and each of the piezoelectric elements 4 are bonded securely in diffused junction.

In the same way, the mirror substrate 3 is bonded onto each of the piezoelectric elements 4 via a thin metal layer portion (not shown) in the diffused junction 2. The thin metal layer portion is formed on the inner surface of the mirror substrate 3 by vapor deposition or sputtering or the like.

Thus, in the present embodiment, the Si thin film portion on the inner surface of the support substrate 2 is connected electrically to each of the piezoelectric elements 4 via the thin metal layer portion so as to be a separated electrode for applying an electric field to each of the piezoelectric elements 4. On the other hand, The mirror substrate 3 made of Si is connected electrically to each of the piezoelectric elements 4 via the thin metal layer portion so as to be a common electrode for applying an electric field to each of the piezoelectric elements 4.

Although the thin metal film portion is used as a type of adhesive for bonding the support substrate 2 and the piezoelectric element 4 to each other, and for bonding the mirror substrate 3 and the piezoelectric element 4 to each other in diffused junction in the present embodiment, it is possible to use a conductive adhesive for bonding them. In addition, it is possible to use a nonconductive adhesive of epoxy system or the like for bonding them, but in this case, it is necessary to make electric connection between the Si wiring pattern from the Si thin film portion on the inner surface of the support substrate 2 and the piezoelectric element 4, and between the mirror substrate 3 made of Si and the piezoelectric element 4 by additional wire bonding or the like.

Although the mirror substrate 3 and the piezoelectric element 4 are bonded to each other in the present embodiment, it is possible to use a laminated piezoelectric element with electrodes drawn out from both sides can be used as the piezoelectric element 4, for example. In this case, if the Si thin film portion on the inner surface of the support substrate 2 is divided into two parts so that each of the Si thin film portions is connected to each electrode of the laminated piezoelectric element, an electric field can be applied to each of the piezoelectric elements 4. Therefore, it is sufficient to make a simple contact state between the mirror substrate 3 and the piezoelectric element 4 without bonding them to each other.

The support pillar 5 supports the mirror substrate 3. The support pillar 5 in the present embodiment is made of the same material as the piezoelectric element 4 and is bonded to the support substrate 2 and the mirror substrate 3 in the same manner as the above-mentioned piezoelectric element 4. Although the support pillar 5 is formed separately from the support substrate 2 in the present embodiment, it is possible to form the support pillar 5 integrally with the support substrate 2.

As to the variable shape mirror 1 having the structure described above, the reflection plane of reflection film 6 of the mirror substrate 3 is flat as shown in FIG. 1A, in the non-driven state, i.e., the state where a voltage is not applied to each of the piezoelectric elements 4. On the other hand, when a predetermined voltage is applied to each of the piezoelectric elements 4 so that an electric field is applied for driving, each of the piezoelectric elements 4 is expanded between the support substrate 2 and the mirror substrate 3 as shown in FIG. 1B. In accordance with the expansion, the mirror substrate 3 is pressed upward so as to be deformed elastically in a convex shape, and the reflection plane of the reflection film 6 is deformed following the deformation of the mirror substrate 3. Therefore, wave aberration of the laser beam can be corrected by using the above-mentioned variable shape mirror 1 in the optical system of the optical pickup device.

Figure 3A:
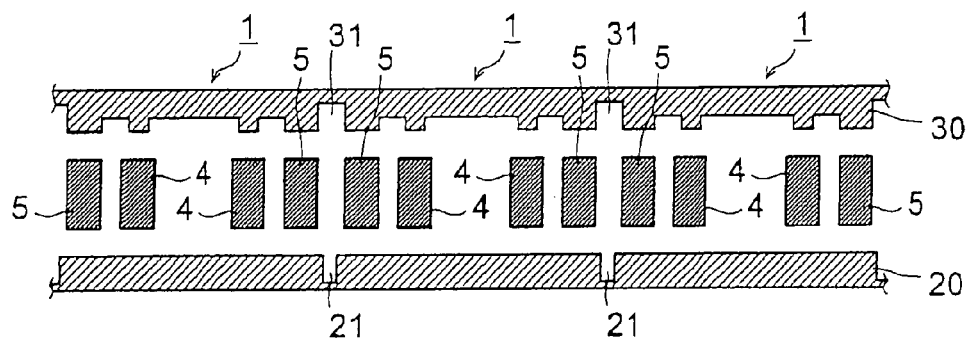
FIGS. 3A-3E are cross sectional views of the variable shape mirror to show a procedure of the manufacturing method for variable shape mirrors according to an embodiment of the present invention.

Next, a manufacturing method for the above-mentioned variable shape mirror will be explained. First, as shown in FIG. 3A, a wafer 20 to be the support substrate 2 (hereinafter referred to as a "first wafer") and a wafer 30 to be the mirror substrate 3 (hereinafter referred to as a "second wafer") are prepared.

On a surface of the first wafer 20, grooves (hereinafter referred to as a "first grooves") 21 are formed along boundaries between areas to be the individual variable shape mirrors 1. For example, if areas to be the individual variable shape mirrors 1 are arranged regularly like a grid with respect to the first wafer 20, the first grooves 21 are formed like a grid. The first grooves 21 are formed at a constant depth to the extent such that the first grooves 21 do not cause accidental cracking of the first wafer 20 in the step of bonding the piezoelectric element 4 and the support pillar 5 or in the step of dividing the second wafer 30 that are performed later. For example, if the first wafer 20 is made of glass having a thickness of 1 mm, it is preferable that approximately ⅓ to ½ of the thickness of the material remains at the portions where the first grooves 21 are formed. The first grooves 21 can be formed by a dicing saw, chemical etching, sandblasting or the like. Note that in the present embodiment, the surface on which the first grooves 21 are formed is provided with the Si thin film portion, the Si wiring pattern and the thin metal layer portion that are formed in the areas to be the individual variable shape mirrors 1 as describe above as the structure of the variable shape mirror 1.

On the other hand, grooves (hereinafter referred to "second grooves") 31 are formed on one surface of the second wafer 30 along the boundary between the areas to be the individual variable shape mirrors 1, corresponding to the first grooves 21 formed on the first wafer 20. For example, if the areas to be the individual variable shape mirrors 1 are arranged regularly like a grid with respect to the second wafer 30, the second grooves 31 are formed like a grid. The second grooves 31 are formed at a constant depth to the extent such that the second grooves 31 do not cause accidental cracking of the second wafer 30 in the step of bonding the piezoelectric element 4 and the support pillar 5 that are performed later. For example, if the second wafer 30 is made of Si having a thickness of 200 μm, it is preferable that approximately ⅖ to ⅗ of the thickness of the material remains at the portion where the second grooves 31 are formed. The second grooves 31 can be formed by a dicing saw, chemical etching, sandblasting or the like. If the second wafer 30 is made of Si, it is preferable to use reactive ion etching (RIE) for forming the second grooves 31. Note that in the present embodiment, the surface on which the second grooves 31 are formed is provided with the thin metal layer portion that is formed in the areas to be the individual variable shape mirrors 1 as describe above as the structure of the variable shape mirror 1.

Figure 3B:
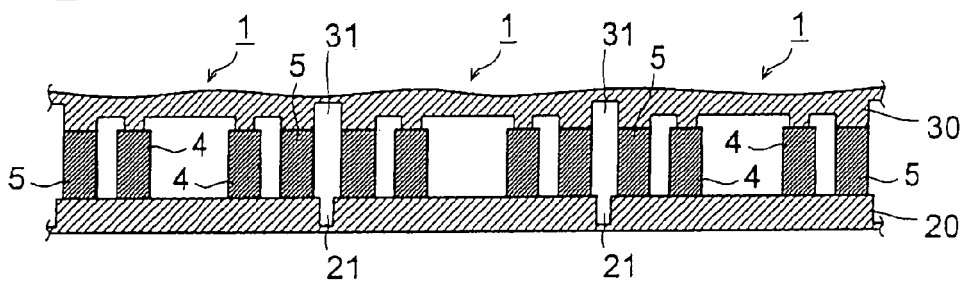

Next, as shown in FIG. 3B, the first wafer 20 and the second wafer 30 are arranged so that the surface of the first wafer 20 on which the first grooves 21 are formed and the surface of the second wafer 30 on which the second grooves 31 are formed face each other while the first grooves 21 and the second grooves 31 correspond to each other. In other words, the surface of the first wafer 20 on which the first grooves 21 are formed and the surface of the second wafer 30 on which the second grooves 31 are formed are arranged to face each other inward, and in this state the areas to be the individual variable shape mirrors 1 are opposed to each other. Here, the support pillars 5 and the piezoelectric elements 4 are sandwiched between the first wafer 20 and the second wafer 30 at the portions to be the individual variable shape mirrors 1. Then, the first wafer 20 and the support pillar 5, the first wafer 20 and the piezoelectric element 4, the second wafer 30 and the support pillar 5, and the second wafer 30 and the piezoelectric element 4 are bonded to each other, respectively. In the present embodiment, the first wafer 20 and the support pillar 5, the first wafer 20 and the piezoelectric element 4, the second wafer 30 and the support pillar 5, and the second wafer 30 and the piezoelectric element 4 are pressed to each other while they are heated, so that the first wafer 20 and the support pillar 5, the first wafer 20 and the piezoelectric element 4, the second wafer 30 and the support pillar 5, and the second wafer 30 and the piezoelectric element 4 are bonded securely to each other in the diffused junction.

In this way, after the first wafer 20, the second wafer 30, the piezoelectric element 4 and the support pillar 5 are bonded to each other, a local residual stress may occur at each of the bonding portions between the second wafer 30 and the support pillar 5, and between the second wafer 30 and the piezoelectric element 4. Then, the residual stress mainly causes a distortion in the second wafer 30, which may become the state of waving slightly in many cases. FIG. 3B shows this state in an exaggerated manner. If the second wafer 30 has remaining distortion when it becomes the mirror substrate 3 finally, the reflection film 6 that is formed on the outer surface of it also has remaining distortion, so an appropriate flat reflection plane cannot be obtained. In the present embodiment, such a distortion is removed by the following steps.

Figure 3C:
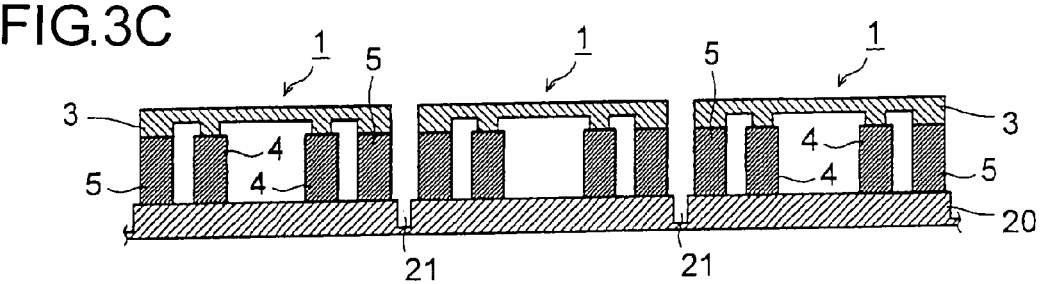

As shown in FIG. 3C, a flattening process is performed on the entire area of the outer surface of the second wafer 30 by polishing the surface until it reaches the second groove 31. As this flattening process, a polishing process or an etching process can be used. In the former process, a flat grindstone is pressed to the entire area of the outer surface of the second wafer 30, and the outer surface is polished. In the latter process, the entire area of the outer surface of the second wafer 30 is etched by a chemical/physical process. Thus, the second wafer 30 is divided into the mirror substrates 3 corresponding to the areas to be the individual variable shape mirrors 1, and the outer surface of each of the mirror substrates 3 becomes flat without a distortion.

Figure 3D:
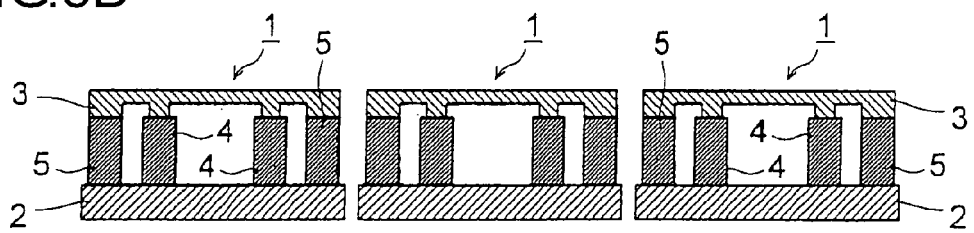

After that, as shown in FIG. 3D, the first wafer 20 is divided along the first grooves 21 this time by applying a force of bending the first wafer 20, for example. Thus, the first wafer 20 is divided into the support substrates 2 corresponding to areas to be the individual variable shape mirrors 1, so that the individual variable shape mirrors 1 are separated.

Figure 3E:
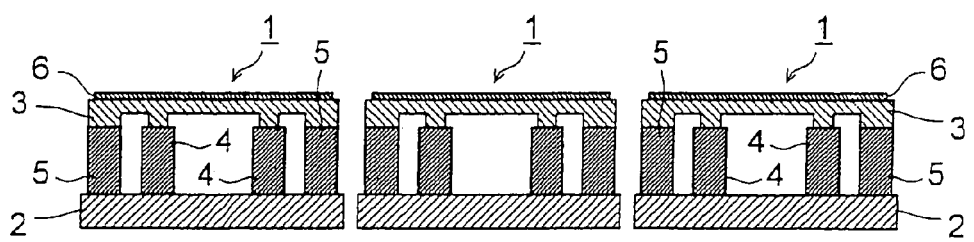
Figure 4:
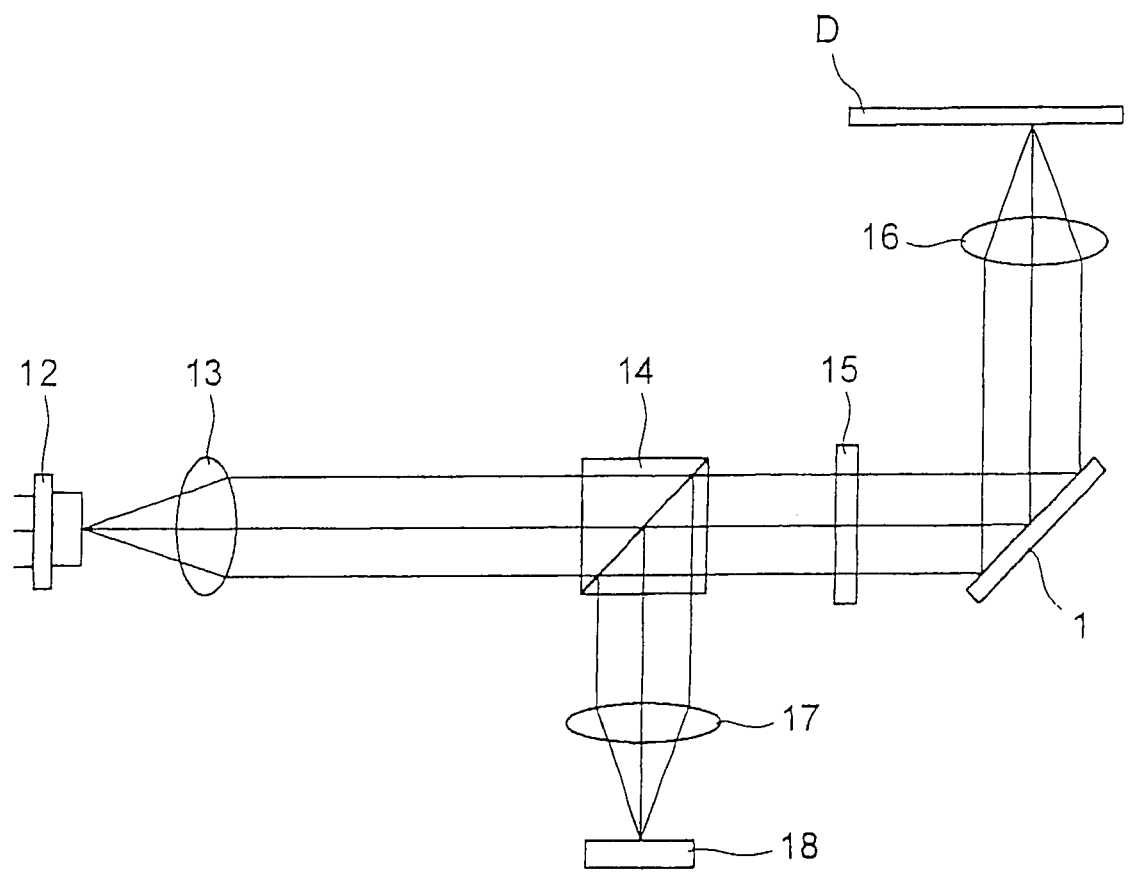
FIG. 4 is a plan view to show a general structure of an optical pickup device that adopts a variable shape mirror.

Then, as shown in FIG. 3E, the reflection film 6 is formed on the outer surface of each of the mirror substrates 3. Thus, a plurality of variable shape mirrors 1 can be obtained at the same time. Although the formation of the reflection film 6 on each of the mirror substrates 3 is performed after dividing the first wafer 20 in the present embodiment, it may be performed before the first wafer 20 is divided.

The variable shape mirror 1 obtained as described above has the reflection film 6 that is formed on the flattened outer surface of the mirror substrate 3, so the reflection plane of the reflection film 6 is also flat. Therefore, according to the manufacturing method of the present embodiment, many variable shape mirrors 1 having good quality can be obtained at the same time. Thus, the manufacturing method of the present embodiment is sufficiently suitable for mass production.

The present invention is not limited to the embodiment described above, but it can be modified variously within the scope of the present invention without deviating from the spirit thereof. For example, the surface on which the first grooves 21 of the first wafer 20 are formed may face outward as long as the areas to be the individual variable shape mirrors 1 are opposed to each other. In this case, the Si thin film portion, the Si wiring pattern and the thin metal layer portion are formed on the surface of the first wafer 20 opposite to the surface on which the first grooves 21 are formed.

The present invention is useful particularly for manufacturing variable shape mirrors.

What is claimed is:

1. A manufacturing method for variable shape mirrors, each of the variable shape mirrors comprising:
   a support substrate;
   a mirror substrate that is opposed to the support substrate and is supported by support pillars and has a reflection film on the surface; and
   piezoelectric elements that are sandwiched between the support substrate and the mirror substrate and are expanded or contracted when an electric field is applied so that they deform the mirror substrate and the reflection film, and
   the manufacturing method comprising:

a first wafer groove forming step for forming first grooves along boundaries between areas to be the variable shape mirrors on a surface of a first wafer to be the support substrate;

a second wafer groove forming step for forming second grooves along boundaries between the areas on a surface of a second wafer to be the mirror substrate;

a bonding step for arranging the first wafer and the second wafer so that the support pillars and the piezoelectric elements are sandwiched between the first wafer and the second wafer at the areas with the surface on which the second grooves are formed facing inward, so as to bond at least the first wafer and the support pillars to each other, the first wafer and the piezoelectric elements to each other, and the second wafer and the support pillars to each other;

a second wafer dividing step for dividing the second wafer into the mirror substrates by flattening process of the outer surface of the second wafer until at least reaching the second groove;

a first wafer dividing step for dividing the first wafer into the support substrates by breaking the first wafer along the first grooves; and a reflection film forming step for forming the reflection film on the outer surface of each of the mirror substrates obtained by the dividing step.

2. The manufacturing method for variable shape mirrors according to claim 1, wherein the flattening process is a polishing process or an etching process.

3. The manufacturing method for variable shape mirrors according to claim 2, wherein a thin metal layer is disposed between the first wafer and the support pillar and between the first wafer and the piezoelectric element at their bonding portions, and they are pressed to each other while they are heated, so that they are bonded to each other.

4. The manufacturing method for variable shape mirrors according to any one of claims 3, wherein the first wafer is arranged so that the surface on which the first grooves are formed faces inward.

5. The manufacturing method for variable shape mirrors according to any one of claims 2, wherein a thin metal layer is disposed between the second wafer and the support pillar and between the second wafer and the piezoelectric element at their bonding portions, and they are pressed to each other while they are heated, so that they are bonded to each other.

6. The manufacturing method for variable shape mirrors according to any one of claims 2, wherein the first wafer is arranged so that the surface on which the first grooves are formed faces inward.

7. The manufacturing method for variable shape mirrors according to claim 1, wherein a thin metal layer is disposed between the first wafer and the support pillar and between the first wafer and the piezoelectric element at their bonding portions, and they are pressed to each other while they are heated, so that they are bonded to each other.

8. The manufacturing method for variable shape mirrors according to any one of claims 7, wherein a thin metal layer is disposed between the second wafer and the support pillar and between the second wafer and the piezoelectric element at their bonding portions, and they are pressed to each other while they are heated, so that they are bonded to each other.

9. The manufacturing method for variable shape mirrors according to any one of claims 7, wherein the first wafer is arranged so that the surface on which the first grooves are formed faces inward.

10. The manufacturing method for variable shape mirrors according to any one of claims 1, wherein a thin metal layer is disposed between the second wafer and the support pillar and between the second wafer and the piezoelectric element at their bonding portions, and they are pressed to each other while they are heated, so that they are bonded to each other.

11. The manufacturing method for variable shape mirrors according to any one of claims 1, wherein the first wafer is arranged so that the surface on which the first grooves are formed faces inward.

* * * * *